March 2, 1948.   H. WEIER   2,437,011
GAS TURBO-ELECTRIC LOCOMOTIVE
Filed March 8, 1945   2 Sheets-Sheet 1

Inventor:
Heinrich Weier.

By Pierce & Scheffler,
Attorneys.

Patented Mar. 2, 1948

2,437,011

UNITED STATES PATENT OFFICE 2,437,011

GAS TURBOELECTRIC LOCOMOTIVE

Heinrich Weier, Ennetbaden, Switzerland, assignor to Aktiengesellschaft Brown, Boveri & Cie, Baden, Switzerland Application March 8, 1945, Serial No. 581,683
In Switzerland February 3, 1944

Section 1, Public Law 690, August 8, 1946
Patent expires February 3, 1964

6 Claims. (Cl. 290—14)

With gas turbine locomotives with electrical power transmission a gas turbine drives a compressor and with the surplus power a generator, this latter supplying the traction motors of the vehicle. Since with such plants the power consumption of the compressor amounts to several times the useful power, a very favourable regenerative braking is possible with gas turbine locomotives because during braking the compressor can absorb power from the traction motors. In other words during the braking period, when the power of the gas turbine decreases due to a reduced fuel supply and is no longer able to provide the power required by the compressor, the missing power can be supplied by the traction motors which then operate as generators, these motors supplying the generator coupled to the compressor and operating as a motor, whereby the vehicle is braked.

With such braking arrangements the traction motors which operate as generators have to be separately excited and for this purpose up to the present a special exciter machine, the so-called braking exciter, had to be provided. These special exciter machines, however, cause an undesirable increase in the weight of the plant and also require additional space which in view of the very restricted space available in the locomotive is also a serious disadvantage.

The object of the present invention is to avoid the aforementioned disadvantages of regenerative braking in gas turbine locomotives with electrical power transmission. According to the invention this is achieved by providing several generators for the electrical power transmission, these generators being coupled to the compressor and at least one of them serving as a braking exciter for the traction motors operating as generators during the braking period, whilst the other generators running as motors drive the compressor. By thus dividing the useful power amongst several generators the exciter which has to be usually provided can be omitted and there is still the greatest part of the useful power available as braking power.

Figure 1:
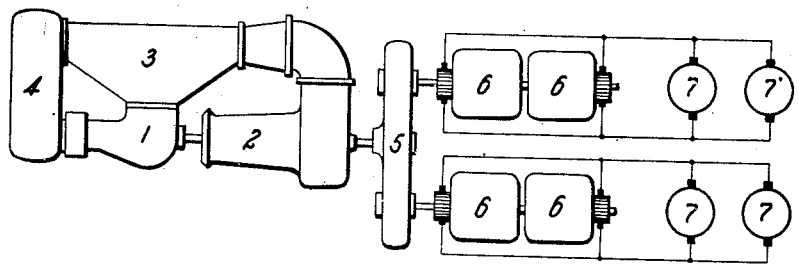
Figure 2:
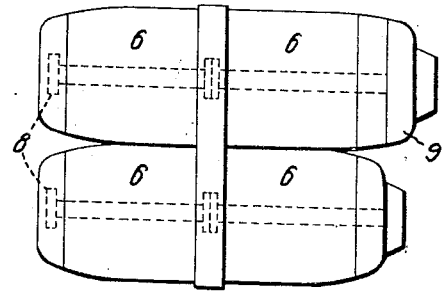
Figure 3:
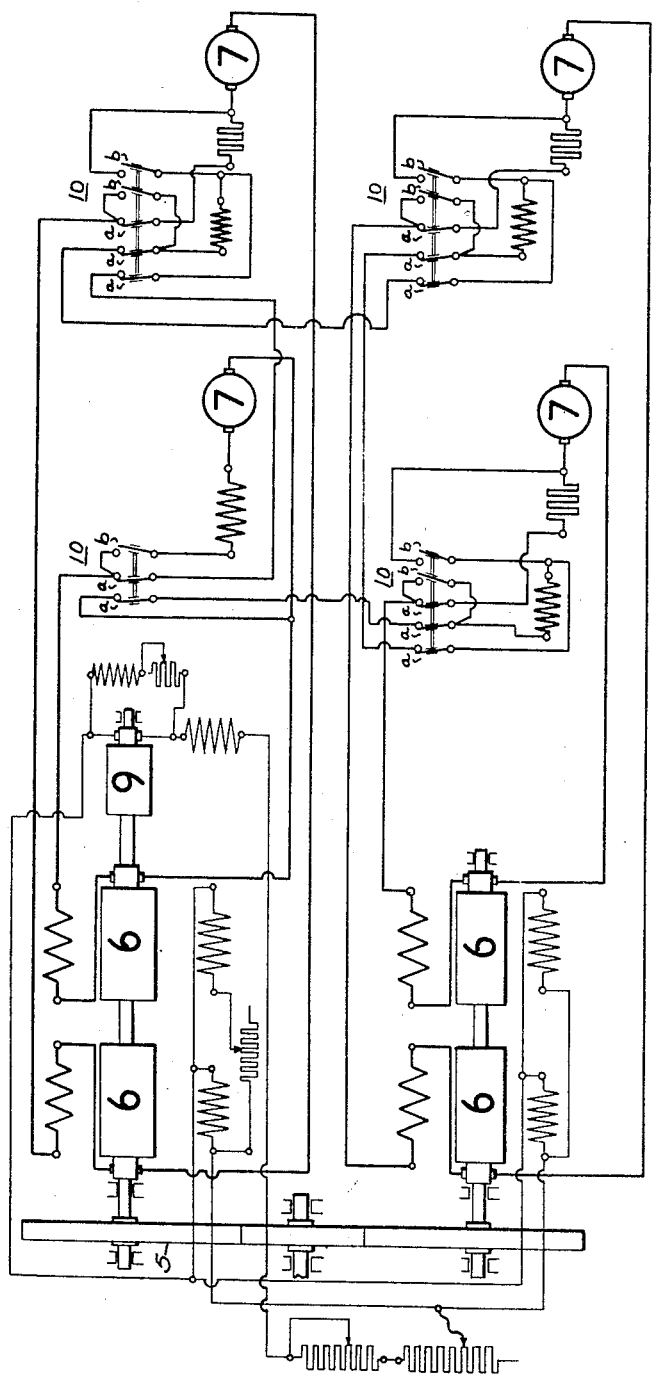

A constructional example of the invention is illustrated in the accompanying drawing in diagrammatic form, Fig. 1 showing a gas turbine locomotive arrangement with four generators for the electrical transmission of the power, and Fig. 2 a particularly favourable arrangement of the generators to an enlarged scale. Fig. 3 is a schematic circuit diagram of the locomotive control showing a suitable relay arrangement for switching the generators and motors from their running to braking connections.

In Fig. 1 reference numeral 1 indicates the gas turbine for driving a compressor 2 which supplies over a preheater 3 the air required for combustion in the combustion chamber 4, the driving gases for the gas turbine being taken from this chamber 4. The surplus power of the gas turbine, that is the useful power, drives over gearing 5 the four generators 6, these latter being arranged in pairs one behind the other on the same shaft. Generators 6 supply traction motors 7 which either directly or by means of gearing drive the driving wheels of the vehicle.

When braking, traction motors 7 operate as generators and must have a separate excitation, and for this purpose one of the generators 6 is used as a braking exciter for all the traction motors 7. This is of course possible because the current of generators 6 supplies a suitable excitation current for all the traction motors 7. The remaining three generators 6 operate as motors during braking and drive the compressor 2 over gearing 5 so that the gas turbine 1 load is decreased and the latter requires less fuel for its operation. These three generators 6 suffice for all the required braking power because this power amounts to about three-quarters of the useful power. The braking power can be regulated by varying the excitation of motors 7 or generators 6, or also by controlling the combustion air delivered by compressor 2.

A very favourable arrangement of the generators 6 is obtained when these are located in twos one behind the other on one and the same shaft and are at the same time constructed in the form of "twin" generators arranged next to each other. A self-contained exciter 9 for the generators is provided on one of the shafts 8 which are driven by a common gear wheel. Fig. 3 shows a preferred circuit arrangement for switching the generators 6 and motors 7 from running to braking connections. With the contacts $a$—$b$ of the switching relays 10 in the position shown in Fig. 2, contacts $a$ being "closed" and contacts $b$ "open," the locomotive power plant is arranged for "braking" operations as described above wherein three of the four dynamo-electric machines 7 functions as generators to deliver power to three of the four machines 6. The fourth of the machines 6 serves as an exciter for the machines 7. With the relay contacts $a$ "open" and the $b$ contacts "closed," the plant is in the "running" position with machines 6 delivering traction power to the machines 7.

Exciter 9 supplies excitation current to the machines 6 as also previously explained.

This division of the generators not only enables weight and space to be saved due to the elimination of a special exciter, but also possesses the important advantage that high-speed machines can be used for the generators, these being very favourable as regards weight and size. This also provides favourable conditions for the gearing.

I claim:

1. Gas turbine locomotive comprising a gas turbine driving a compressor, a plurality of traction motors, a plurality of generators driven from said gas turbine over gearing, circuit means arranging said generators to supply power to said motors for driving said locomotive, and means rearranging at least one of said generators to function as an exciter for said motors during regenerative braking operation of said locomotive, the remainder of said generators at such time operating as motors for driving said compressor.

2. Gas turbine locomotive as in claim 1, characterised by the feature that the generators are divided into several groups, the generators of each group being arranged one behind the other on a common shaft.

3. Gas turbine locomotive as in claim 1, characterized by the feature that said generators are divided into several groups, the generators of each group being arranged one behind the other on a common shaft and the said groups being constructed as twin units arranged next to each other.

4. Gas turbine locomotive as in claim 1, characterised by the feature that at least two generators are built directly together in the direction of their axes, the groups of generators thus formed being arranged next to each other with their axes parallel.

5. Gas turbine locomotive as in claim 1, characterized by the feature that at least two generators are built directly together in the direction of their axes, groups of generators thus formed being arranged next to each other with their axes parallel and built directly together.

6. Gas turbine locomotive as in claim 1, characterised by the feature that said generators are arranged in groups, the several groups being driven by a common gear wheel.

HEINRICH WEIER.

REFERENCES CITED

The following references are of record in the file of this patent:

UNITED STATES PATENTS

| Number | Name | Date |
|---|---|---|
| 1,083,730 | Collisehonn | Jan. 6, 1914 |
| 1,784,524 | Jensen | Dec. 9, 1930 |
| 2,165,982 | Schmer | July 11, 1939 |
| 2,262,195 | Noack | Nov. 11, 1941 |
| 2,263,705 | Seippel | Nov. 25, 1941 |
| 2,298,309 | Ray | Oct. 13, 1942 |
| 2,336,052 | Anderson et al. | Dec. 7, 1943 |
| 2,339,185 | Nettel | Jan. 11, 1944 |
| 2,363,714 | Nettel | Nov. 14, 1944 |